(12) United States Patent
Yamamoto et al.

(10) Patent No.: US 10,883,543 B2
(45) Date of Patent: Jan. 5, 2021

(54) ROLLING BEARING WITH ROTATION SENSOR

(71) Applicant: NTN CORPORATION, Osaka (JP)

(72) Inventors: Naota Yamamoto, Mie (JP); Shota Toho, Mie (JP)

(73) Assignee: NTN CORPORATION, Osaka (JP)

(*) Notice: Subject to any disclaimer, the term of this patent is extended or adjusted under 35 U.S.C. 154(b) by 0 days.

(21) Appl. No.: 16/468,181

(22) PCT Filed: Dec. 13, 2017

(86) PCT No.: PCT/JP2017/044688
§ 371 (c)(1),
(2) Date: Jun. 10, 2019

(87) PCT Pub. No.: WO2018/110592
PCT Pub. Date: Jun. 21, 2018

(65) Prior Publication Data
US 2019/0390715 A1  Dec. 26, 2019

(30) Foreign Application Priority Data

Dec. 14, 2016 (JP) ................................. 2016-242136

(51) Int. Cl.
*F16C 19/36* (2006.01)
*F16C 33/66* (2006.01)
(Continued)

(52) U.S. Cl.
CPC .............. *F16C 41/00* (2013.01); *F16C 19/36* (2013.01); *F16C 33/726* (2013.01);
(Continued)

(58) Field of Classification Search
CPC ...... F16C 19/36; F16C 33/667; F16C 33/726; F16C 33/7813; F16C 33/7816;
(Continued)

(56) References Cited

U.S. PATENT DOCUMENTS 5,293,787 A * 3/1994 Paul ........................ G01P 3/488
384/448
5,407,213 A   4/1995 Ouchi et al.
(Continued)

FOREIGN PATENT DOCUMENTS

CN   102606504   7/2012
CN   103477102   12/2013
(Continued)

OTHER PUBLICATIONS

International Preliminary Report on Patentability dated Jun. 18, 2019 in International (PCT) Patent Application No. PCT/JP2017/044688.
(Continued)

*Primary Examiner* — Marcus Charles
(74) *Attorney, Agent, or Firm* — Wenderoth, Lind & Ponack, L.L.P.

(57) ABSTRACT

A rolling bearing is provided which includes an inner ring; an outer ring; rolling elements disposed in the bearing space; a cage rollably retaining the rolling elements; and a seal member made of a resin. The seal member includes a support frame, a plurality of window holes, and a filter closing the window holes. Lubricating oil flows through the bearing space to lubricate the interior of the rolling bearing. The cage is made of a magnetic material, and has a pulse ring integrally formed at an end of the cage. The rolling bearing further includes a magnetic rotation sensor mounted to the seal member so as to be capable of being opposed to any of recesses and protrusions of the pulse ring.

13 Claims, 6 Drawing Sheets

(51) Int. Cl.
*F16C 33/78* (2006.01)
*F16C 41/00* (2006.01)
*G01B 7/14* (2006.01)
*G01D 5/245* (2006.01)
*G01K 5/52* (2006.01)
*G01P 3/44* (2006.01)
*F16C 33/72* (2006.01)
*G01P 3/487* (2006.01)

(52) U.S. Cl.
CPC ........ F16C 33/7816 (2013.01); F16C 41/007 (2013.01); G01B 7/14 (2013.01); G01D 5/245 (2013.01); G01K 5/52 (2013.01); G01P 3/44 (2013.01); G01P 3/487 (2013.01); *F16C 2202/40* (2013.01)

(58) Field of Classification Search
CPC .... F16C 33/7886; F16C 41/00; F16C 41/007; F16C 2202/40; G01P 3/44; G01P 3/487; G01B 7/14; G01D 5/245; G01K 5/52
USPC ................. 384/94, 448, 477, 523, 572, 607; 277/500, 918
See application file for complete search history.

(56) References Cited

U.S. PATENT DOCUMENTS

| | | | |
|---|---|---|---|
| 5,492,416 A | | 2/1996 | Gabelli et al. |
| 5,513,918 A | * | 5/1996 | Wan ...................... F16C 33/667 384/477 |
| 2003/0231014 A1 | | 12/2003 | Moretti et al. |
| 2006/0155507 A1 | * | 7/2006 | Yanagisawa .......... G01M 13/04 702/145 |
| 2010/0038958 A1 | | 2/2010 | Tsuzaki et al. |
| 2014/0011622 A1 | | 1/2014 | Sone et al. |
| 2015/0167743 A1 | * | 6/2015 | Yamauchi ........... F16C 33/7813 384/462 |
| 2016/0025138 A1 | * | 1/2016 | Watanabe ........... F16C 33/6659 384/448 |
| 2016/0061268 A1 | | 3/2016 | Ohira et al. |

FOREIGN PATENT DOCUMENTS

| | | | | |
|---|---|---|---|---|
| DE | 3735070 A | * | 4/1989 | .......... F16C 33/7853 |
| DE | 4037104 A1 | * | 6/1991 | .............. G01P 3/443 |
| DE | 4412307 A1 | * | 10/1995 | .............. F16D 65/10 |
| DE | 102010034324 A1 | * | 2/2012 | ........... F16C 33/416 |
| GB | 1319953 A | * | 6/1973 | .......... F16C 33/7843 |
| JP | 55-94541 | | 6/1980 | |
| JP | 61028737 A | * | 2/1986 | .............. F02D 41/36 |
| JP | 01140070 A | * | 6/1989 | .............. G01P 3/443 |
| JP | 6-080957 | | 11/1994 | |
| JP | 6-323335 | | 11/1994 | |
| JP | 2005-344842 | | 12/2005 | |
| JP | 2006-92412 | | 4/2006 | |
| JP | 2007-51683 | | 3/2007 | |
| JP | 2008-247072 | | 10/2008 | |
| JP | 2010133782 A | * | 6/2010 | |
| JP | 2010-190281 | | 9/2010 | |
| JP | 4668227 | | 4/2011 | |
| JP | 2012017854 A | * | 1/2012 | .............. F16C 41/007 |
| SU | 1661501 A1 | * | 7/1991 | .............. F16C 33/66 |
| WO | WO-2012128316 A1 | * | 9/2012 | ........ F16H 57/0471 |
| WO | 2014/188473 | | 11/2014 | |
| WO | WO-2016013463 A1 | * | 1/2016 | ............ F16C 33/726 |

OTHER PUBLICATIONS

International Search Report dated Mar. 13, 2018 in International (PCT) Patent Application No. PCT/JP2017/044688.

* cited by examiner

ROLLING BEARING WITH ROTATION SENSOR

CROSS-REFERENCE TO RELATED APPLICATIONS

This application is the National Stage of International Application No. PCT/JP2017/044688, filed Dec. 13, 2017.

TECHNICAL FIELD

The present invention relates to a rolling bearing used, e.g., in an oil pump or an automobile's transmission to support a rotary shaft, and particularly to a rolling bearing with a rotation sensor for detecting the number of rotations of the bearing's cage or inner ring.

BACKGROUND ART

For example, the below-identified Patent Documents 1 to 5 each discloses a conventional rolling bearing to which a rotation sensor is integrally mounted.

The rolling bearing of Patent Document 1 is a ball bearing including a rotation sensor constituted by the combination of a magnetic detection element and an encoder magnetized such that the north poles circumferentially alternate with the south poles at regular pitches, or, instead of the encoder, a magnetic pressed member formed with windows (see paragraph [0020]).

The encoder is mounted to the inner ring while supported by a holder. The magnetic detection element is mounted to a sensor housing fixed to the outer ring, and detects the rotation, of, e.g., the encoder.

The rolling bearing of Patent Document 2 is also a ball bearing. This ball bearing includes a rotation sensor constituted by the combination of a tone ring (pulse ring, see FIG. 2) mounted to the inner ring, and a magnetic sensor retained by the outer ring.

The magnetic sensor is mounted to a sensor housing fixed to the outer ring, and detects the rotation of the tone ring which rotates together with the inner ring.

Patent Document 3 discloses, as a rotation support device with a sensor, a device including a rolling bearing similar in structure to the ball bearing of Patent Document 1 (see FIG. 4); an encoder mounted to a rotary shaft supported by the inner ring of the bearing; and a sensor for detecting the rotation of the encoder. The sensor is mounted to a bearing housing to which the outer ring of the bearing is fitted, or a support annulus mounted to an end of the outer ring (see FIGS. 1 and 5).

Patent Document 4 discloses that the rotation speed of the cage of a bearing is detected by a revolution sensor disposed outside of the bearing (paragraph 0032).

Patent document 5 discloses a monitoring device in which an encoder in which the north poles circumferentially alternate with the south poles at regular pitches is integrally mounted to a cage, and a sensor detects the rotation of the cage.

PRIOR ART DOCUMENTS

Patent Documents

Patent document 1: WO2014/188473
Patent document 2: Japanese Unexamined Patent Application Publication No. 2010-190281
Patent document 3: Japanese Unexamined Patent Application Publication No. 2006-092412
Patent document 4: Japanese Patent No. 4668227
Patent document 5: Japanese Unexamined Patent Application Publication No. 2005-344842

SUMMARY OF THE INVENTION

Problems to be Solved by the Invention

The number of rotations of the cage of a bearing is different from the number of rotations of the inner ring, and also fluctuates, e.g., according to the load applied.

If the number of rotations of the cage can be measured accurately, it would be possible to monitor, based on the obtained measurement data, the behavior of the bearing, how the rolling elements are rotating about their axes, and any damage to the bearing. However, among the conventional tapered roller bearings including a rotatable inner ring, and a stationary outer ring, and supporting a rotary shaft, there are none which includes, as an integral element, a rotation sensor for detecting the number of rotations of the cage.

Since a tapered roller bearing is assembled by separately mounting the inner ring and the outer ring separately, it is structurally difficult to integrally mount a rotation sensor to the outer ring. This apparently prevents the realization of a tapered roller bearing to which a sensor is integrally mounted.

With the rolling bearing of Patent Document 1, since an encoder is mounted to the inner ring, it is impossible to accurately measure the number of rotations of the cage.

With the rolling bearing of Patent Document 1, since it is necessary to separately provide an encoder magnetized such that the north poles circumferentially alternate with the south poles, or a magnetic pressed member formed with windows, the bearing unit tends to be complicated in structure, large in size, and expensive.

With the rolling bearing of Patent Document 2, too, since a tone ring is separately mounted to the inner ring to measure the rotation of the inner ring, it is impossible to accurately measure the number of rotations thereof as in the rolling bearing of Patent Document 1, and, also, the bearing tends to be complicated in structure, large in size, and expensive.

With the rotation support device with a sensor of Patent Document 3, too, since a dedicated encoder needs to be mounted to the inner ring of the bearing or the rotary shaft supported by the inner ring, the device tends to be complicated in structure, large in size, and expensive.

While Patent Document 3 discloses that, by mounting the encoder to the cage, it is possible to detect, from the rotation of the encoder, the revolution speed (moving speed around the axis of the bearing) of the balls (rolling elements) retained by the cage (see paragraph 0023), nothing is disclosed regarding the details of the encoder (mounted to the cage).

While Patent Document 4 discloses that the revolution sensor detects the rotation speed of the cage of the bearing, this revolution sensor is an external sensor.

Therefore, the structure of Patent Document 4 cannot be used in a rolling bearing unit in which lubrication oil passes through the bearing space between the inner ring and the outer ring so as to lubricate the interior of the rolling bearing unit, and in which a seal member is mounted to the entrance of the bearing space, the seal member including a filter for filtering the lubricating oil, thereby catching foreign matter contained in the lubricating oil. The reason is because there is no sufficient space for mounting such an external sensor.

With the monitoring device of Patent Document 5, while a portion of the cage forms the encoder, since this encoder has north and south poles circumferentially alternating with each other at regular pitches, such an encoder increases the manufacturing cost of the monitoring device.

Also, with the monitoring device of Patent Document 5, since the sensor is mounted to an end surface of a housing in which a bearing is received, it is impossible to measure the rotation of the bearing's cage with only the bearing.

It is an object of the present invention to realize and provide a rolling bearing to which a rotation sensor is integrally mounted, the rotation sensor being capable of accurately detecting the number of rotations of the inner ring or the cage, even if the rolling bearing is a tapered roller bearing.

Means for Solving the Problems

In order to achieve the above object, the present invention provides a rolling bearing with a rotation sensor, the rolling bearing comprising: an inner ring; an outer ring fixedly mounted in a housing; rolling elements disposed in a bearing space defined between the inner ring and the outer ring; a cage having pockets in which the respective rolling elements are received so as to rollably retain the rolling elements; at least one seal member made of a resin, and mounted to an opening of the bearing space at one end of the bearing space; wherein the seal member is fixed to one or both of the outer ring and the housing; characterized in that the cage is made of a magnetic material, and includes a pulse ring integrally formed at an end of the cage opposed to the seal member, the pulse ring having recesses and protrusions, the recesses and protrusions being circumferentially arranged at regular pitches; wherein the rolling bearing further comprises a magnetic rotation sensor mounted to the seal member so as to be capable of being opposed to any of the recesses s and the protrusions of the pulse ring (this rolling bearing is referred to as "rolling bearing of the first aspect").

The seal member may be disposed at the end of the bearing space through which lubricating oil is discharged, or at the end of the bearing space through which lubricating oil is introduced.

It is preferable that, in the rolling bearing of the first aspect, the recesses of the pulse ring are circumferentially displaced from the pockets of the cage in which the rolling elements are received.

The magnetic rotation sensor is preferably mounted to the cylindrical portion of the seal member.

The bearing unit of the present invention may include a rolling bearing, wherein the inner ring includes a pulse ring having recesses and protrusions; and wherein the rolling bearing further comprises a magnetic rotation sensor mounted so as to be capable of being opposed to any of the recesses and the protrusions of the pulse ring (this rolling bearing is referred to as " "rolling bearing of the second aspect).

The bearing unit of the present invention may include a rolling bearing, wherein the cage includes a first pulse ring having recesses and protrusions, and the inner ring includes a second pulse ring having recesses and protrusions; and wherein the rolling bearing further comprises first and second magnetic rotation sensors mounted such that the first magnetic rotation sensor is capable of being opposed to any of the recesses and the protrusions of the first pulse ring, and such that the second magnetic rotation sensor is capable of being opposed to any of the recesses and the protrusions of the second pulse ring (this rolling bearing is referred to as " "rolling bearing of the third aspect).

In the rolling bearing of each of the second and third embodiments, the magnetic rotation sensor opposed to the pulse ring of the inner ring or the second magnetic rotation sensor opposed to the second, pulse ring of the inner ring is also mounted to the seal member so as to be integrally mounted to the rolling bearing.

The magnetic rotation sensor, or each of the first magnetic rotation sensor and the second magnetic rotation sensor is configured to output a detection signal of either of a digital waveform and an analogue waveform (sine wave). If a sensor configured to output a detection signal of an analogue waveform is mounted to the cylindrical portion of the seal member, it is possible to detect the temperature of the bearing, too.

It is also possible to detect the temperature of the bearing by additionally mounting a gap sensor to the cylindrical portion of the seal member, the gap sensor being capable of detecting a change in distance between the gap sensor and the inner ring. The temperature measurement of the bearing is described in detail in the item of "DETAILED DESCRIPTION OF THE INVENTION".

Effects of the Invention

Since a pulse ring or rings integrally mounted to one or both of the cage and the inner ring, and a magnetic rotation sensor or sensors mounted to the seal member supported by the outer ring are used in the rolling bearing of the present invention, even if the rolling bearing is used as a tapered rolling bearing, it is possible to very accurately detect the number of rotations of the cage and/or the number of rotations of the inner ring by use of the magnetic rotation sensor or sensors integrally mounted to the bearing, and thus to monitor the state of the bearing based on obtained detection data.

With the rolling bearing of the first aspect, since a pulse ring and a cage are used in combination, compared to a conventional rolling bearing unit with a rotation sensor in which an encoder or a pulse ring is not used in combination like this, the bearing tends to be simple in structure, small in size, and inexpensive.

Also, since a magnetic rotation sensor(s) is mounted to the seal member mounted for the purpose of removing foreign matter contained in lubricating oil, it is not necessary to separately mount a sensor supporting member to the bearing. This also contributes to the simple structure and the small size of the bearing, and cost reduction. These effects can be ensured in the rolling bearing of the second aspect, too.

If the recesses of the pulse ring are circumferentially displaced from the pockets of the cage, it is possible to ensure moderate distances between the recesses and the pockets, and thus to maintain the strength of the cage.

If a magnetic rotation sensor is mounted to the cylindrical portion of the seal member, it is possible to reduce the area of the circulation path of lubricating oil occupied by the thus-mounted magnetic rotation sensor, and thus to reduce the force applied to the magnetic rotation sensor by the flow of lubrication oil.

With the rolling bearing of the third aspect, it is possible to simultaneously measure both the number of rotations of the cage and the number of rotations of the inner ring, and to monitor the bearing's behavior or state by comparing the number of rotations of the cage and the number of rotations of the inner ring.

If a magnetic rotation sensor configured to output a detection signal of an analogue waveform is mounted to the cylindrical portion of the seal member, or if a gap sensor is additionally mounted to the cylindrical portion of the seal member, it is also possible to measure the temperature of the bearing in addition to the measurement of the number of rotations. This is described later.

DETAILED DESCRIPTION OF THE INVENTION

FIGS. 1 to 11 show a rolling bearing with a rotation sensor embodying the present invention, as used in an oil pump 10.

Figure 1:
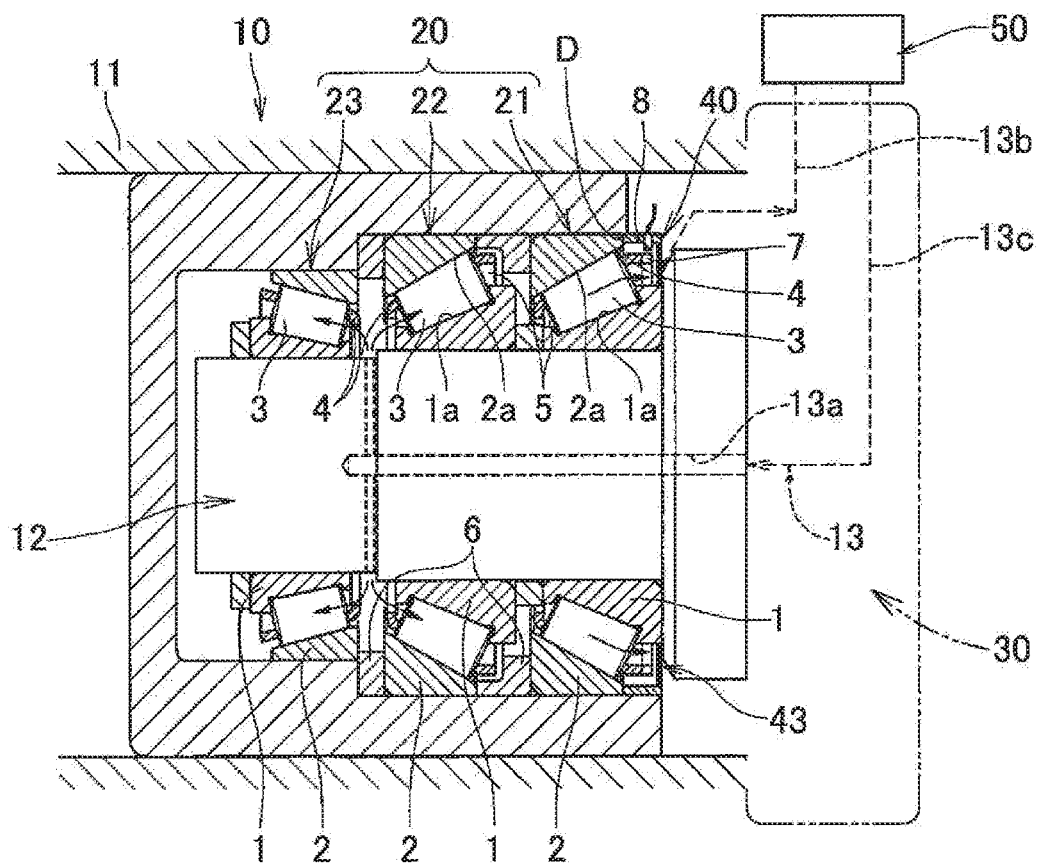
FIG. 1 is a sectional view of an oil pump in which a rolling bearing with a rotation sensor embodying the present invention is used.

As illustrated in FIG. 1, the oil pump 10 includes, in its interior, a bearing unit 20; and an operation mechanism 30 provided with a pump rotor (not shown) configured to suck, compress and discharge oil.

The bearing unit 20 includes three rolling bearings 21, 22 and 23 arranged in juxtaposition with each other in a housing 11, and lubricated by oil.

The oil pump 10 further includes a rotary shaft 12 supported by the rolling bearings 21, 22 and 23. The pump rotor of the operation mechanism 30 is driven by the rotary shaft 12 to suck, compress and discharge oil.

Each of the rolling bearings 21, 22 and 23 includes an inner ring (inner bearing race) 1 having a raceway surface 1a; an outer ring (outer bearing race) 2 having a raceway surface 2a; rolling elements 3 (tapered rollers in the example shown) disposed between the raceway surface 1a of the inner ring 1 and the raceway surface 2a of the outer ring 2; and a cage 4 having pockets 4a circumferentially arranged at regular pitches. The rolling elements 3 are received in the respective pockets 4a so as to be rollably retained by the cage 4 while being arranged at regular pitches in the circumferential direction.

The outer rings 2 of the respective rolling bearings 21, 22 and 23 are fixedly press-fitted to the radially inner surface of the housing 11, and thus are non-rotatable.

The inner rings 1 of the respective rolling bearings 21, 22 and 23 are fixed to the outer periphery of the rotary shaft 12 so as to be non-rotatable relative to the rotary shaft 12.

The rolling bearings 21, 22 and 23 may be bearings including spherical or cylindrical rolling elements. The number of the rolling bearings mounted in the oil pump is not limited. Lubricating oil flows through bearing spaces 5 (shown in FIG. 1) defined between the inner and outer rings of the rolling bearings. A plurality of spacers 6 (FIG. 1) maintain the positional relationship between the rolling bearings 21 and 22 and between the rolling bearings 22 and 23.

The oil pump 10 includes, in its interior, a circulation path 13 through which lubricating oil sucked, compressed and discharged by the pump rotor flows.

A portion of the circulation path 13 is constituted by a hole 13a formed in the rotary shaft 12 along the center axis of the rotary shaft 12. After passing through the hole 13a, oil passes through the bearing space 5 between the inner and outer rings 1 and 2 of the rolling bearing 22, and then passes through the bearing space 5 between the inner and outer rings 1 and 2 of the rolling bearing 21. Then, the oil passes through a delivery path portion 13b of the circulation path 13 formed in the housing 11, and flows into an operation mechanism 50 disposed outside of the pump.

From the operation mechanism 50, the oil flows through a return path portion 13c of the circulation path 13 formed in the housing 11, and into the operation mechanism 30 of the oil pump, where the oil is sucked and discharged again into the circulation path 13 by the pump rotor of the operation mechanism 30.

In the example shown, the oil pump 10 includes a seal member 40 mounted to one end opening, namely the end opening through which oil flows out, of the bearing space 5 between the inner and outer rings of the rolling bearing 21, namely the bearing located downstream of the other two bearings in the direction in which oil flows.

Figure 2:
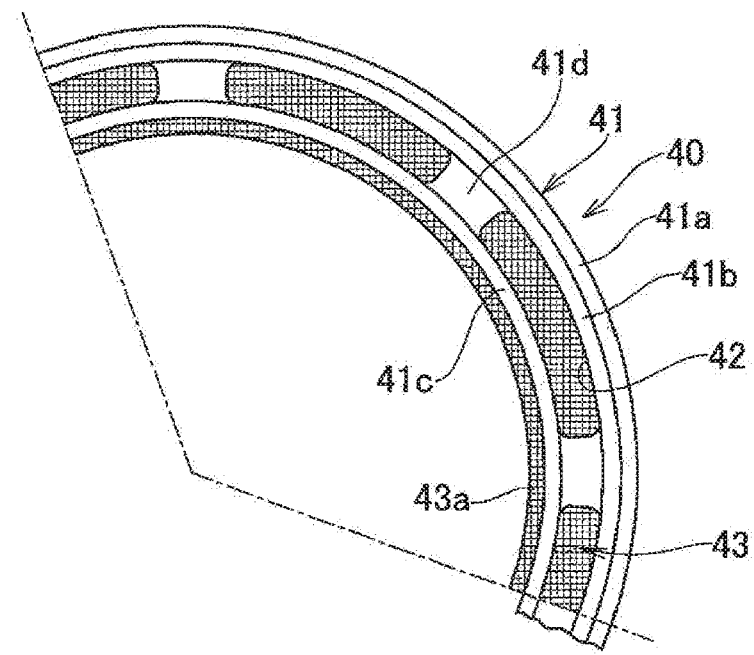
FIG. 2 is an end view of a portion of a seal member integrally mounted to the rolling bearing used in the oil pump of FIG. 1.
Figure 3:
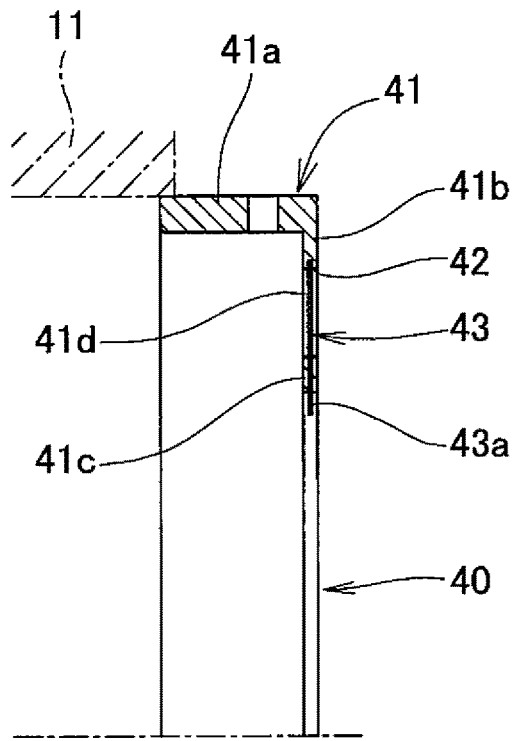
FIG. 3 is a sectional view of a portion of the seal member.

As illustrated in FIGS. 2 and 3, the shown seal member 40 includes a circular annular support frame 41 having window holes 42, and a filter 43 having a predetermined mesh size, and integrally superposed on the support frame 41 such that the window holes 42 are closed by the filter 43.

The shown support frame 41 includes a cylindrical portion 41a; an end wall 41b having the window holes 42, and connected to the inner periphery of the cylindrical portion 41a at one end thereof; and an inner ring 41c connected to the inner edge of the end wall 41b through ribs 41d. The support frame 41 is fixed in position, e.g., by press-fitting the cylindrical portion 41a into a hole of the housing 11, or by coupling the cylindrical portion 41a to the outer ring 2 of the rolling bearing 21 by use of an appropriate coupling member (not shown).

The window holes 42 of the support frame 41 are circumferentially arranged at predetermined intervals, and are closed by the filter 43, through which oil is allowed to pass. The filter 43 includes a radially protruding portion 43a radially inwardly protruding beyond the inner ring 41c.

Figure 7:
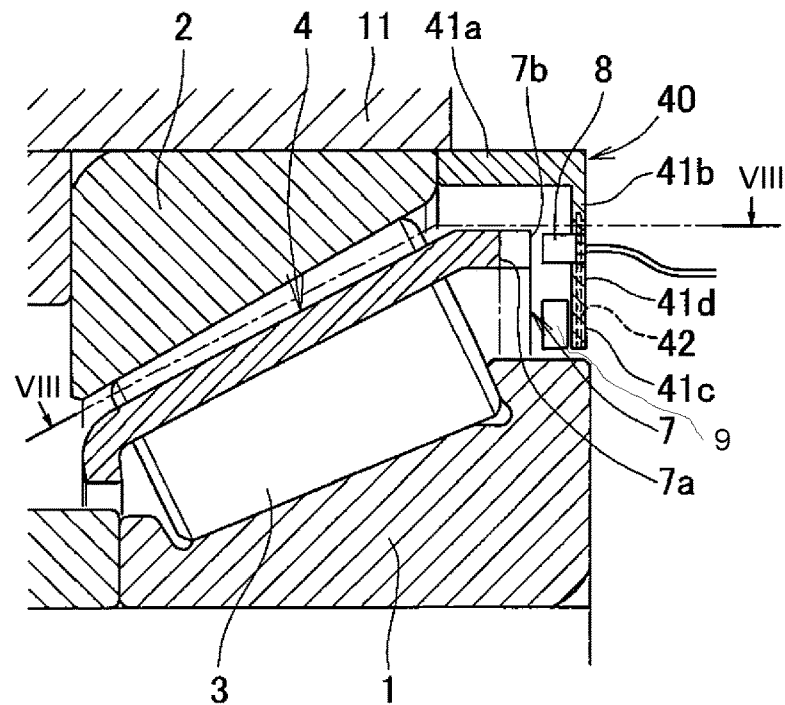
FIG. 7 is a sectional view of the rolling bearing in which a magnetic rotation sensor is mounted to a rib of a support frame of the seal member.
Figure 8:
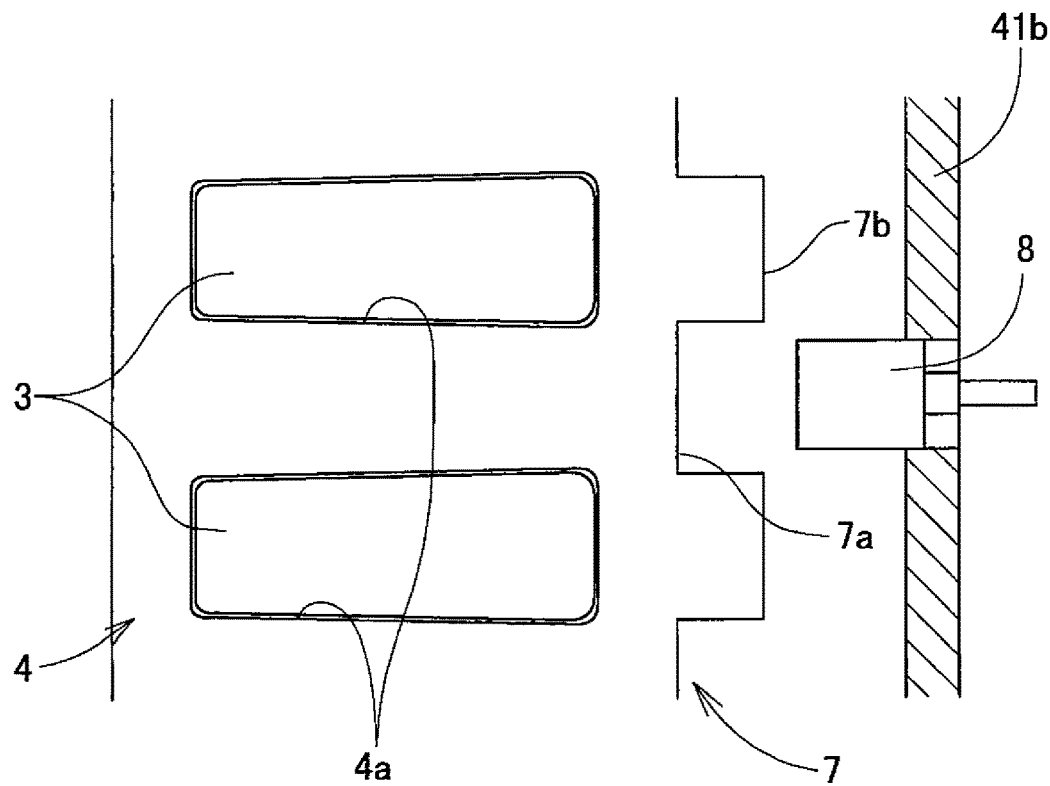
FIG. 8 is a reduced sectional view taken along line VIII-VIII of FIG. 7.
Figure 10:
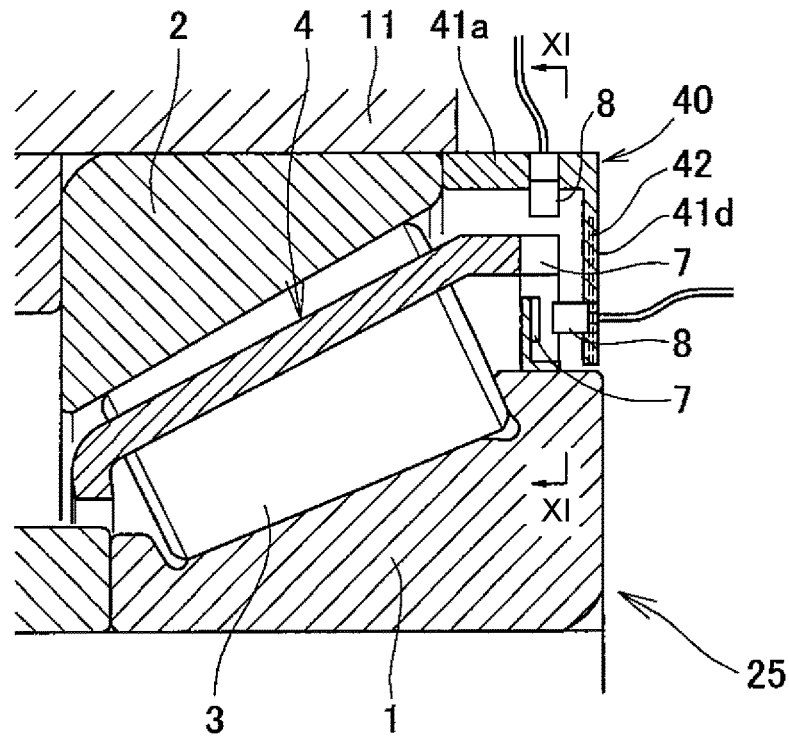
FIG. 10 is an enlarged sectional view of a portion of a rolling bearing with a rotation sensor according to a third embodiment of the present invention.

In the example shown, the support frame 41 of the seal member 40 is made of a fiber-reinforced resin, and the filter 43 comprises a mesh made of a resin. The resin materials of the support frame 41 and the filter 43 are not limited to particular ones. As illustrated in FIGS. 7 and 10, the filter 43 of the seal member 40 may not include the radially protruding portion 43a so that a small gap is defined between the inner ring 41c and the inner ring 1 (of the rolling bearing 21).

Figure 4:
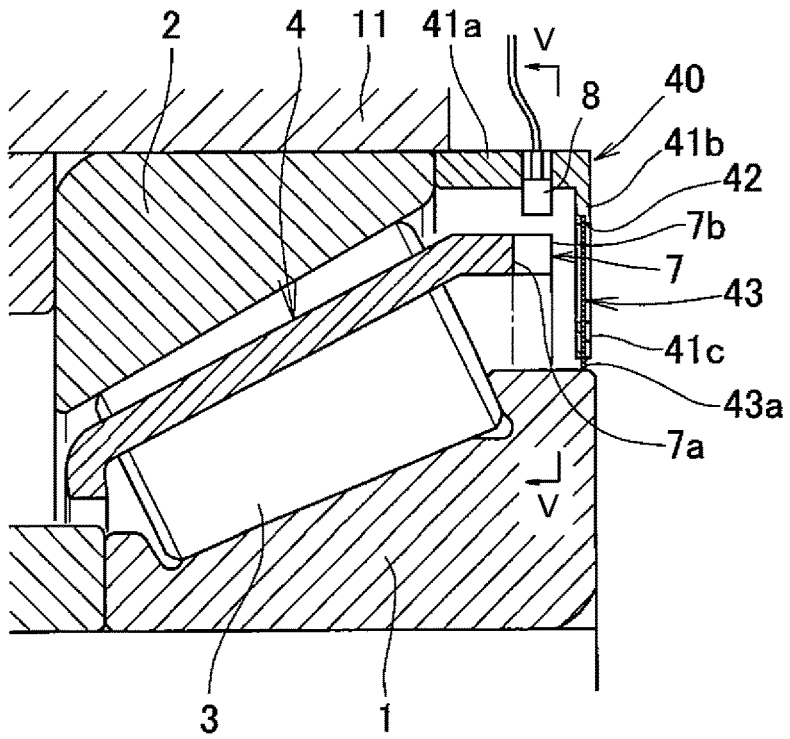
FIG. 4 is an enlarged sectional view of a portion of the rolling bearing used in the oil pump of FIG. 1.
Figure 5:
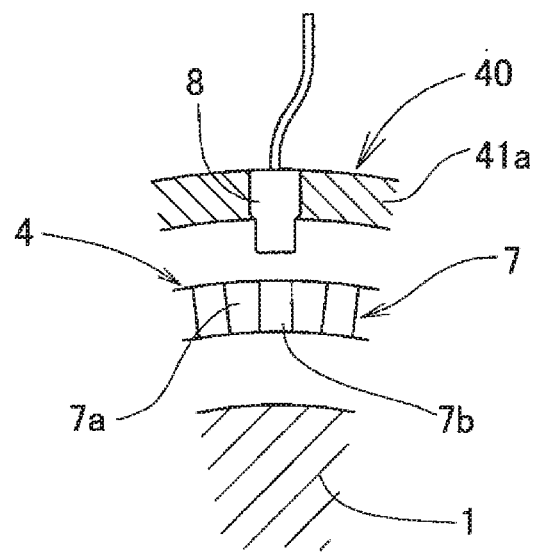
FIG. 5 is a sectional view taken along line V-V of FIG. 4.
Figure 6:
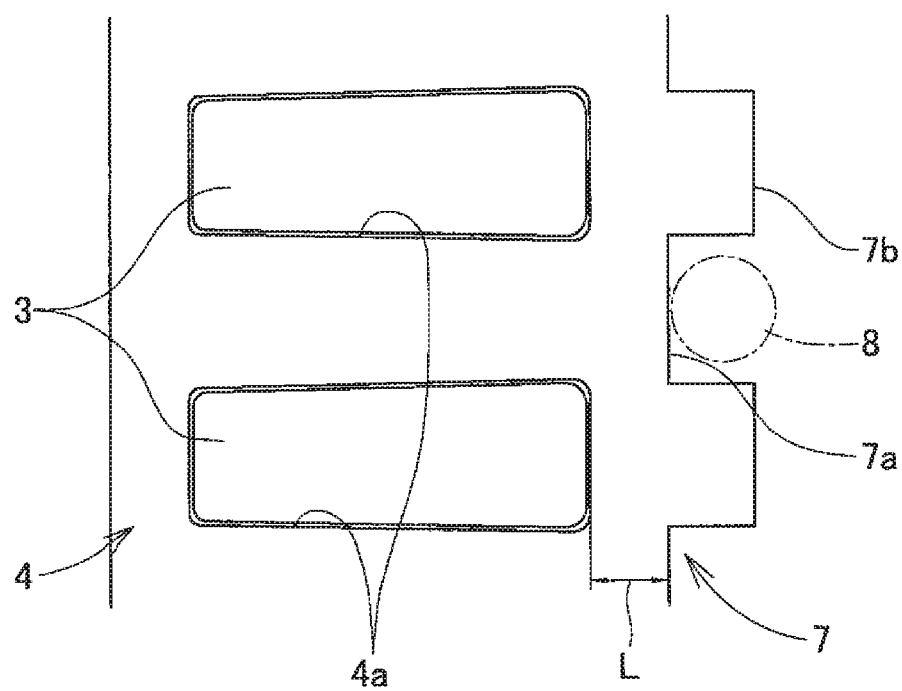
FIG. 6 is a developed plan view of a portion of the cage of the rolling bearing illustrated in FIG. 4.

The cage 4 of the rolling bearing 21 is made of a ferromagnetic iron plate, and as illustrated in FIGS. 4 to 6, a pulse ring 7 is integrally formed at the end of the cage 4 opposed to the end wall 41b of the seal member 40.

As illustrated in FIG. 6, the pulse ring 7 includes recesses 7a recessed in the axial direction (direction of the center axis of the bearing); and protrusions 7b which are non-recessed portions defined between the respective circumferentially adjacent recesses 7a such that the recesses 7a and the protrusions 7b are arranged at regular pitches in the circumferential direction.

In the example shown, as illustrated in FIG. 6, the recesses 7a of the pulse ring 7 of the rolling bearing 21 are circumferentially displaced from (i.e., not axially aligned with) the pockets 4a of the cage 4.

With this arrangement, the distance L between each pocket 4a and the corresponding recess 7a (see FIG. 6) is, larger than with an arrangement in which the recesses 7a are axially aligned with (i.e., not circumferentially displaced from) the pockets 4a. This ensures sufficient strength of the cage 4.

As illustrated in FIGS. 4 and 5, a magnetic rotation sensor 8 is mounted to the seal member 40 so as to be capable of being opposed to any of the recesses 7a and protrusions 7b of the pulse ring 7. The magnetic rotation sensor 8 is a known sensor configured to generate a magnetic field between the pulse ring 7 and the magnetic rotation sensor 8, and to detect the number of rotations of the pulse ring 7 from the number of fluctuations (increases and decreases) of the magnetic field as the pulse ring 7 rotates.

As illustrated in FIG. 7, the magnetic rotation sensor 8 may be mounted to a rib 41d of the support frame 41 so as to face in the axial direction of the rolling bearing 21. However, as illustrated in FIG. 4, the magnetic rotation sensor 8 is preferably mounted to the cylindrical portion 41a of the support frame 41 so as to face in the radial direction of the rolling bearing 21.

As the pulse ring 7 rotates, the waveform of the detection signal fluctuates (increases and decreases), thereby enabling the magnetic rotation sensor 8 to measure the number of rotations of the cage 4 from the number of fluctuations of the waveform per unit time.

The seal member 40, made of a resin, expands and contracts as the environmental temperature changes. If the magnetic rotation sensor 8 is mounted to the cylindrical portion 41a of the support frame 41, the expansion and the contraction of the seal member 40 will result in a change in the distance between the magnetic rotation sensor 8 and the cage 4 (more accurately, the pulse ring 7 integral with the cage 4) of the rolling bearing 21.

Therefore, if a sensor configured to output a detection signal of an analogue waveform is used as the magnetic rotation sensor 8, the output value of the analogue waveform from the magnetic rotation sensor 8 changes due to the change in the above distance.

The change of this output waveform is closely related to the change in temperature. Therefore, it is possible to measure the temperature of the bearing based on the detected output waveform by referring to the relationship (obtained in advance) between the fluctuation of the output waveform and the change in temperature.

Figure 9:
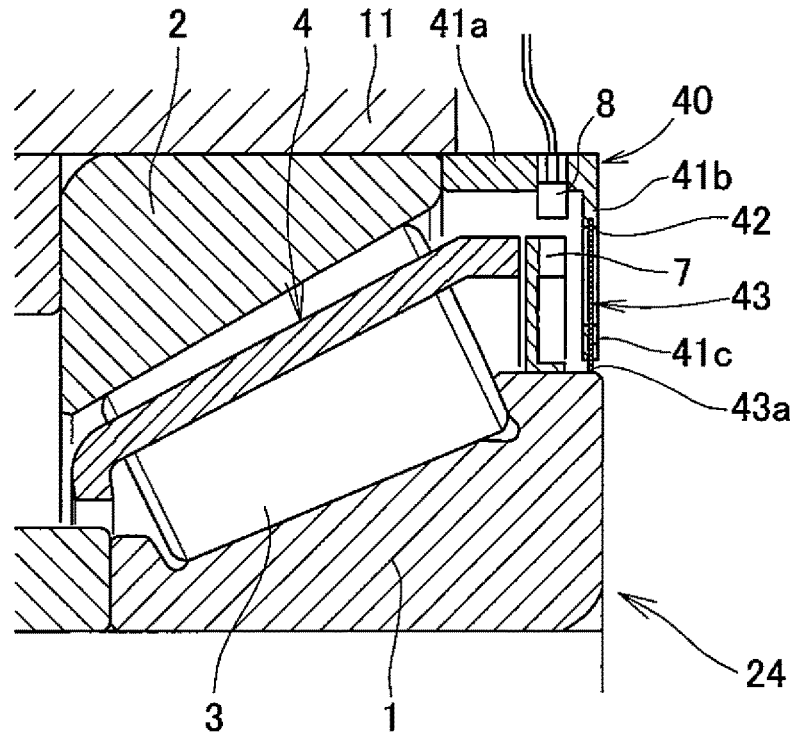
FIG. 9 is an enlarged sectional view of a portion of a rolling bearing with a rotation sensor according to a second embodiment of the present invention.

FIG. 9 exemplifies a rolling bearing 24 with a rotation sensor according to the second embodiment of the present invention, in which the inner ring 1 includes the pulse ring 7, and the magnetic rotation sensor 8 for detecting the rotation of the pulse ring 7 is mounted to the cylindrical portion 41a of the support frame of the seal member 40 so as to be capable of being opposed to any of the recesses 7a and the protrusions 7b of the pulse ring 7.

In the rolling bearing 24 of the second embodiment, it is possible to measure the number of rotations of the inner ring 1 by the magnetic rotation sensor 8 and the pulse ring 7 integrally mounted to the inner ring 1.

If a sensor configured to output a detection signal of an analogue waveform is used as the magnetic rotation sensor 8, the distance between the magnetic rotation sensor 8 and the pulse ring 7 changes due to the expansion and contraction of the seal member 40 caused by the temperature change, thereby changing the output value from the magnetic rotation sensor 8. Therefore, it is also possible to detect the temperature of the bearing from the change in this output value.

If it is not necessary to measure the temperature of the rolling bearing 24 of the second embodiment, the magnetic rotation sensor 8 may be mounted to the end wall 41b of the support frame 41. However, if the magnetic rotation sensor 8 is mounted to the cylindrical surface 41a of the support frame 41, it is possible to reduce the force applied to the magnetic rotation sensor 8 by the flow of lubricating oil. Therefore, it is preferable to mount the magnetic rotation, sensor 8 to the cylindrical surface 41a, if there is sufficient space to do so.

In either of the first and second embodiments, the temperature of the bearing may be detected by mounting a gap sensor 9 to the end wall 41b of the support frame 41 of the seal member, and measuring a change in the distance between the gap sensor 9 and the inner ring 1 or the cage 4.

If the rolling bearing includes such a gap sensor, it is possible to measure the temperature of the bearing without using the output signal from the magnetic rotation sensor 8, and thus to use, as the magnetic rotation sensor 8, a sensor that outputs a signal of a digital waveform.

Figure 11:
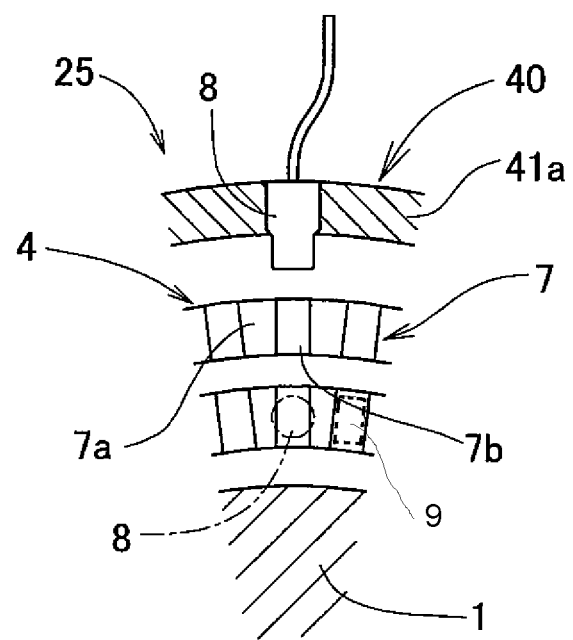
FIG. 11 is a sectional view taken along line XI-XI of FIG. 10.

FIGS. 10 and 11 exemplify a rolling bearing 25 with rotation sensors according to the third embodiment of the present invention. The rolling bearing 25 according to the third embodiment correspond in structural feature to a combination of the rolling bearings according to the first and second embodiments.

Specifically, this bearing includes a first pulse ring 7 integral with the cage 4, and a second pulse ring 7 mounted to the inner ring 1. First and second magnetic rotation sensors 8 are mounted to the support frame 41 of the seal member 40 so that the first rotation sensor 8 detects the rotation of the first pulse ring 7, and the second rotation sensor 8 detects the rotation of the second pulse ring 7.

While, in the example shown, the first magnetic rotation sensor 8 is mounted to the cylindrical portion 41a of the support frame 41, and the second magnetic rotation sensor 8 is mounted to a rib 41b of the support frame 41, both of the first and second magnetic rotation sensors 8 may be mounted to the cylindrical portion 41a.

With the rolling bearing 25 of the third embodiment, it is possible to simultaneously measure both the number of rotations of the cage 4 and the number of rotations of the inner ring 1, and thus to monitor the bearing's behavior or state by comparing the number of rotations of the cage 4 and the number of rotations of the inner ring 1.

If the first magnetic rotation sensor 8, which detects the number of rotations of the cage 4, outputs a detection signal of an analogue waveform, or if a gap sensor 9 is additionally used to measure a change in the distance between the gap sensor 9 and the cage 4 or the inner ring 1, it is also possible to measure the temperature of the bearing.

The rolling bearing according to the present invention may further include a permanent magnet (not shown) mounted to the inner surface of the support frame 41 of the seal member 40, and an iron dust sensor mounted to the support frame 41 so as to detect the amount of iron dust or iron pieces (foreign objects) contained in lubricating oil, and attracted to the permanent magnet.

Prior to the present application, the applicant of the present application filed patent applications directed to bearings designed to prevent or reduce the outflow of foreign objects from the bearing space 5 by forming, in the seal member 40, a lubricating oil flow path shaped like a maze; by attracting iron-based foreign objects contained in lubricating oil to a magnet; by gathering foreign objects captured by the filter 43 into a predetermined place; or by disposing a lubricating oil path between the inner ring 1 and the support frame 41. The seal member 40 of the rolling bearing according to the present invention may have at least one of such structures.

In the rolling bearing 21 of FIG. 1, a seal member 40 is disposed at the lubricating oil outlet of the bearing space 5. However, such a seal member 40 may be disposed at the lubricating oil inlet of the bearing space 5, or two such seal members 40 may be disposed at the lubricating oil inlet and outlet of the bearing space 5, respectively.

A seal member 40 disposed at the lubricating oil inlet of the bearing space 5 can prevent foreign objects outside of the rolling bearing 21 from flowing into the rolling bearing 21.

Two seal members 40 disposed at the lubricating oil inlet and outlet of the bearing space 5, respectively, can prevent foreign objects outside and inside of the rolling bearing 21 from flowing into and out of the rolling bearing 21.

DESCRIPTION OF REFERENCE NUMERALS

1: inner ring
2: outer ring
3: rolling element
4: cage
4a: pocket
5: bearing space
6: spacer
7: pulse ring
7a: recess
7b: protrusion
8: magnetic rotation sensor
10: oil pump
11: housing
12: rotary shaft
13: circulation path
13a: hole
13b: delivery path portion
13c: return path portion
20: bearing unit
21, 22: rolling bearing
23 to 25: rolling bearing with a rotation sensor(s)
30, 50: operation mechanism
40: seal member
41: support frame
41a: cylindrical portion
41b: end wall
41c: inner ring
41d: rib
42: window hole
43: filter L: distance between the pocket of the cage and the recess of the pulse ring.

The invention claimed is:

1. A rolling bearing, the rolling bearing comprising:
an inner ring;
an outer ring fixedly mounted in a housing;
rolling elements disposed in a bearing space defined between the inner ring and the outer ring;
a cage having pockets in which the respective rolling elements are received so as to rollably retain the rolling elements;
at least one seal member made of a resin, and mounted to an opening of the bearing space at one end of the bearing space, the seal member including a support frame having a cylindrical portion;
wherein the seal member is fixed to one or both of the outer ring and the housing;
wherein the cage is made of a magnetic material, and includes a pulse ring integrally formed at an end of the cage opposed to the seal member, the pulse ring having recesses and protrusions, the recesses and protrusions being circumferentially arranged at regular pitches;
a magnetic rotation sensor mounted to the seal member so as to be capable of being opposed to any of the recesses and the protrusions of the pulse ring; and
a gap sensor mounted to the cylindrical portion of the support frame of the seal member so as to detect a change in distance between the gap sensor and the inner ring due to a temperature change.

2. The rolling bearing according to claim 1, wherein the recesses of the pulse ring are circumferentially displaced from the pockets of the cage.

3. The rolling bearing according to claim 2, wherein the magnetic rotation sensor is mounted to the cylindrical portion of the seal member.

4. The rolling bearing according to claim 3, wherein the magnetic rotation sensor is configured to output a detection signal of an analogue waveform.

5. The rolling bearing according to claim 1, wherein the magnetic rotation sensor is mounted to the cylindrical portion of the seal member.

6. The rolling bearing according to claim 5, wherein the magnetic rotation sensor is configured to output a detection signal of an analogue waveform.

7. A rolling bearing, the rolling bearing comprising:
an inner ring;
an outer ring fixedly mounted in a housing;
rolling elements disposed in a bearing space defined between the inner ring and the outer ring;
a cage having pockets in which the respective rolling elements are received so as to rollably retain the rolling elements;
at least one seal member made of a resin, and mounted to an opening of the bearing space at one end of the bearing space, the seal member including:
a support frame having a cylindrical portion supported by one or both of the outer ring and the housing, and an end wall connected to an inner periphery of the cylindrical portion at one end of the cylindrical portion;
a plurality of window holes disposed in the end wall;
a filter closing the window holes;
wherein the rolling bearing is configured such that lubricating oil flows through the bearing space so as to lubricate an interior of the rolling bearing, and the filter filters the lubricating oil, thereby catching foreign matter contained in the lubrication oil;

wherein the inner ring includes a pulse ring having recesses and protrusions;
a magnetic rotation sensor mounted to the seal member so as to be capable of being opposed to any of the recesses and the protrusions of the pulse ring; and
a gap sensor mounted to the cylindrical portion of the support frame of the seal member so as to detect a change in distance between the gap sensor and the inner ring due to a temperature change.

8. The rolling bearing according to claim 7, wherein the magnetic rotation sensor is mounted to the cylindrical portion of the seal member.

9. The rolling bearing according to claim 8, wherein the magnetic rotation sensor is configured to output a detection signal of an analogue waveform.

10. A rolling bearing, the rolling bearing comprising:
an inner ring;
an outer ring fixedly mounted in a housing;
rolling elements disposed in a bearing space defined between the inner ring and the outer ring;
a cage having pockets in which the respective rolling elements are received so as to rollably retain the rolling elements;
at least one seal member made of a resin, and mounted to an opening of the bearing space at one end of the bearing space, the seal member including:
a support frame having a cylindrical portion supported by one or both of the outer ring and the housing, and an end wall connected to an inner periphery of the cylindrical portion at one end of the cylindrical portion;
a plurality of window holes disposed in the end wall; and
a filter closing the window holes,
wherein the rolling bearing is configured such that lubricating oil flows through the bearing space so as to lubricate an interior of the rolling bearing, and the filter filters the lubricating oil, thereby catching foreign matter contained in the lubrication oil;
wherein the cage includes a first pulse ring having recesses and protrusions, and the inner ring includes a second pulse ring having recesses and protrusions; and
first and second magnetic rotation sensors mounted to the seal member such that the first magnetic rotation sensor is capable of being opposed to any of the recesses and the protrusions of the first pulse ring, and such that the second magnetic rotation sensor is capable of being opposed to any of the recesses and the protrusions of the second pulse ring.

11. The rolling bearing according to claim 10, wherein each of the first magnetic rotation sensor and the second magnetic rotation sensor is mounted to the cylindrical portion of the seal member.

12. The rolling bearing according to claim 11, wherein each of the first magnetic rotation sensor and the second magnetic rotation sensor is configured to output a detection signal of an analogue waveform.

13. The rolling bearing according to claim 10, further comprising a gap sensor mounted to the cylindrical portion of the support frame of the seal member so as to detect a change in distance between the gap sensor and the inner ring due to a temperature change.

* * * * *